Nov. 20, 1956 V. R. DESPARD 2,771,501
CONVENIENCE OUTLET FOR INSTALLATION IN FINISHED WALLS
Filed June 25, 1951 3 Sheets-Sheet 1

INVENTOR.
VICTOR R. DESPARD
BY
Leech r Radue
ATTORNEYS

Nov. 20, 1956  V. R. DESPARD  2,771,501
CONVENIENCE OUTLET FOR INSTALLATION IN FINISHED WALLS
Filed June 25, 1951  3 Sheets-Sheet 2

INVENTOR.
VICTOR R. DESPARD
BY
Leech & Radue
ATTORNEYS

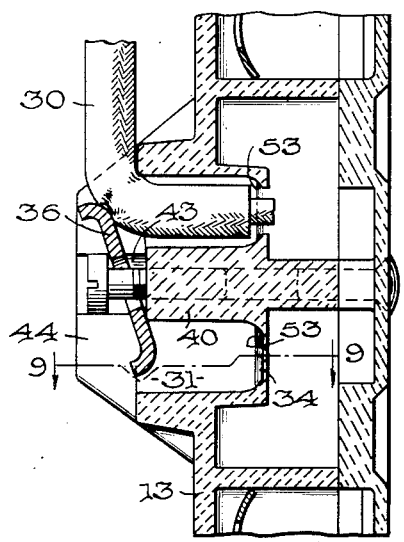
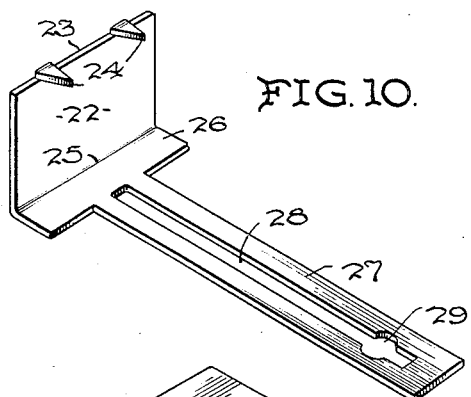
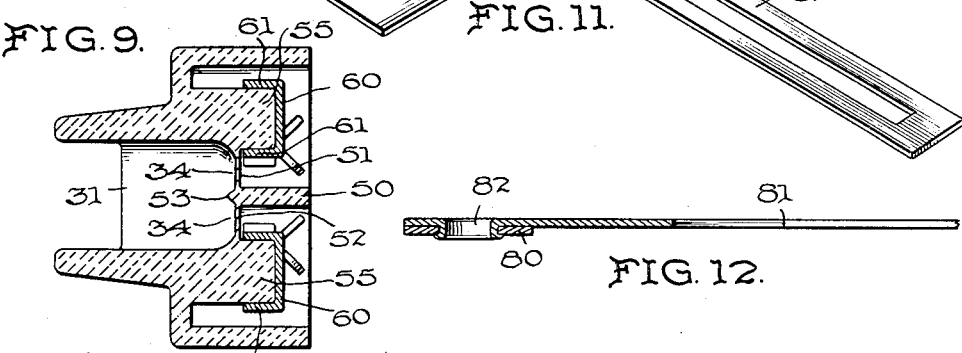
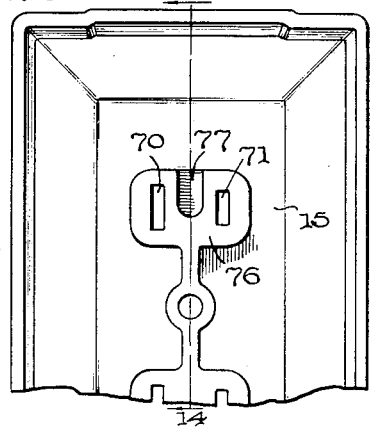
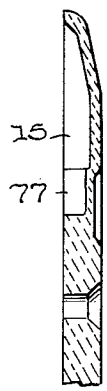
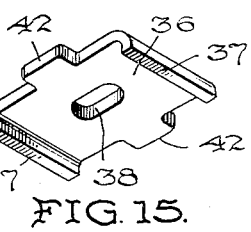
INVENTOR.
VICTOR R. DESPARD

United States Patent Office 2,771,501
Patented Nov. 20, 1956

2,771,501

CONVENIENCE OUTLET FOR INSTALLATION IN FINISHED WALLS

Victor R. Despard, Syracuse, N. Y., assignor to Pass & Seymour, Inc., Syracuse, N. Y., a corporation of New York Application June 25, 1951, Serial No. 233,313

15 Claims. (Cl. 174—53)

This invention relates to electric wiring equipment and more particularly to such equipment for installation in finished walls in what is referred to by electricians as "old work."

It is a general object of the present invention to produce novel and improved wiring equipment of the type described providing added ease of mounting, reduction in the amount of essential materials required, superior facilities for wiring, low cost, etc.

More particularly it is an object of the invention to provide an insulating wiring box for mounting from the front in a finished wall and having spaced corner tabs to bear on the front of the wall and separate end compartments to receive the ends of bent-inbox holding straps.

Another object of the invention contemplates the combination of an insulating wiring box and wiring device contact and terminal parts mounted directly thereon and accessible from the open front of the box.

A further object of the invention comprises the arrangement in an insulating, open front wiring box of a combination dual duplex cable entrance and cable clamp on the back wall of the box, together with spaced single conductor openings through the back wall for directing the conductors in each cable to desired positions in the box.

A still further object of the invention comprises the arrangement of integral mounting blocks on the front face of the rear wall of the box and the capping thereof with the central portions of combined terminal plate and contact units.

An important object of the invention resides in the provision of a fastening strap for use with finished walls for mounting wiring boxes and including a unitary sheet metal device having a flat head portion fitted at one edge with upturned prongs for penetrating the rear of the wall and at an opposite edge with an upturned bendable strap for engagement over a forward edge of a box.

Another important object of the invention resides in the provision of a fastening strap of two part T construction wherein the head and tail portion are overlapped and articulated and the tail portion is longitudinally slotted for ease in bending.

Among the novel features of the invention may be enumerated the following:

One piece insulating box construction;
Combined box and cable passages together with clamp coordinating parts;
Clamp for single or dual cables;
Clamp plate guides to eliminate lateral thrust on clamp screw;
Front wiring arrangement for the convenience outlet;
Separation of opposite polarity parts by integral box partition;
Use of box partition to separate conductors in duplex cables;
Means for polarizing cover plate.

Other and further objects and features of the invention will become apparent to those skilled in the art as the description proceeds with the aid of the accompanying drawings, wherein is disclosed a single embodiment of the invention except for the mounting means, it being understood that such changes may be made therein as fall within the scope of the appended claims without departing from the spirit of the invention.

In said drawings:

Fig. 8 is a fragmentary view similar to Fig. 4 but showing the clamp action with but one cable in position;

Fig. 9 is a horizontal section taken on broken line 9—9 of Fig. 8 showing the breakout closing one set of conductor passages;

Fig. 10 is a perspective view of the preferred form of box mounting strap;

Fig. 11 is a perspective view of a modified form of box mounting strap for use with lath and plaster walls;

Fig. 12 is an edge view of the strap of Fig. 11;

Fig. 13 is a fragmentary rear elevation of the wall plate on a smaller scale than the previous views and showing the polarizing slots;

Fig. 14 is a vertical central section through the wall plate taken on the plane of line 14—14 of Fig. 13; and Fig. 15 is a perspective view of the cable clamp.

Figure 1:
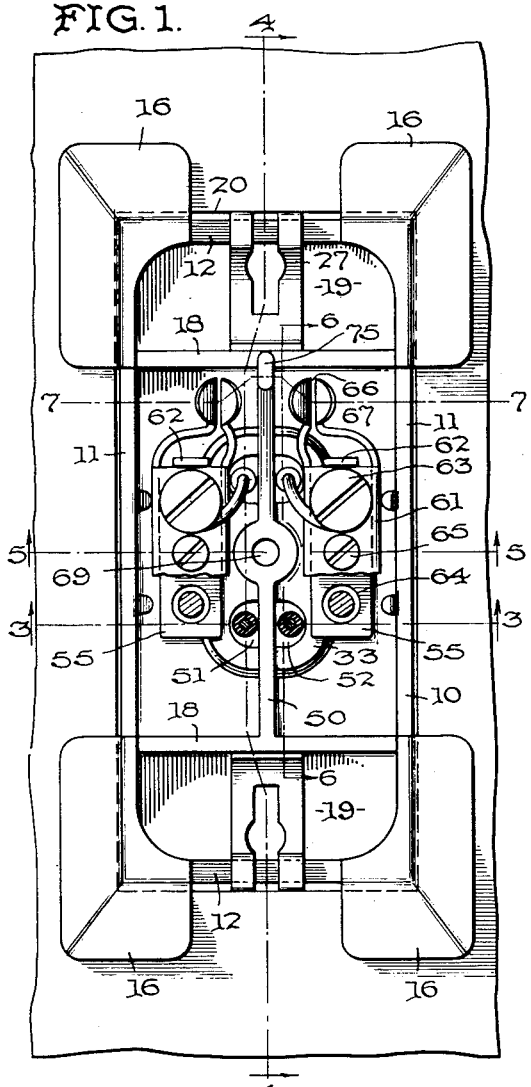
Fig. 1 is a front elevation, with cover plate removed, of a unitary duplex convenience outlet and insulating wall box shown mounted in a finished wall and wired for use, portions of the terminal plates being broken away to show the blocks on which they are mounted.

The wiring of, or additions to the existing wiring in, old houses or other buildings having finished walls has always been an annoying problem for the electrician. Aside from the requirement for assembling the necessary conductors, boxes, wiring devices, cable clamps, wall plates, and some form of makeshift mounting devices for the boxes, all from separate items of stock and loosely carried to the job, he had to consider ways and means for securing the boxes in walls, which of themselves often did not offer secure holding for fastening devices. Such walls if relatively old probably comprise metal or wood lath with several coats of plaster, while if more modern comprise some form of plasterboard and at least a finish plaster coat. Dry wall constructions may include any of the various fiber-boards, sheet plaster, hard boards, plywood and other panelling. These various walls are different in thickness and fastening holding ability, and some have almost none of the latter. The present invention contemplates the presentation of a single combination box and wiring unit packaged with necessary accessories for wiring in finished walls and provides satisfactory mounting means for use with any style of wall construction and finish.

The invention is developed about a one-piece wiring box molded of insulating material, such as shown at 10 in the drawings. This box is generally of shallow rectangular form, having thin side walls 11, slightly thicker end walls 12, an open front and a sturdy rear wall 13.

The inner and outer corners and edges are suitably rounded and filleted for added strength, and the unit is molded from a suitable insulating plastic having necessary strength requirements. The box, although shown twice normal size, is somewhat less in length and width than the conventional single gang junction or switch box and thus fits in a smaller opening in the wall. Such an opening does not have to be accurately cut since there is adequate overlap of the face plate 15 shown in Figs. 3, 4, 5 and others. This will hide quite wide errors in opening size.

Figure 2:
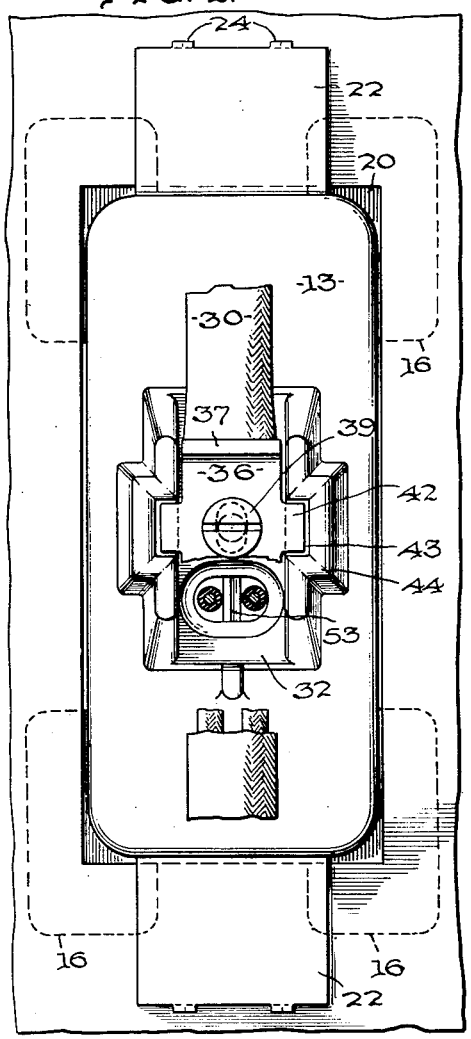
Fig. 2 is a rear elevation of the same, a portion of the cable clamp and the corresponding cable being broken away.
Figure 3:
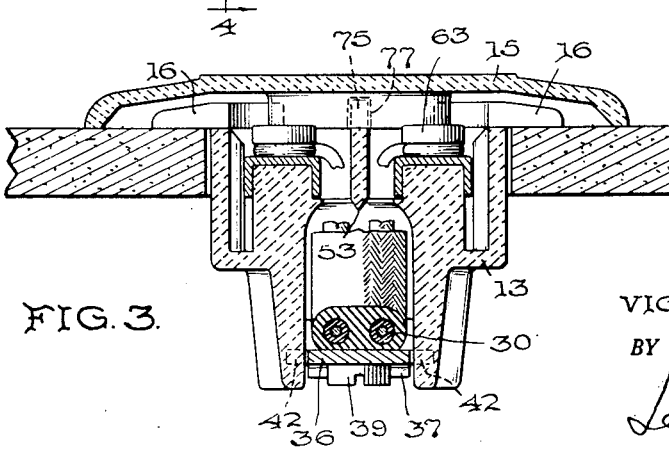
Fig. 3 is a horizontal section taken on the plane of line 3—3 of Fig. 1.

To prevent the box from passing entirely through the wall opening when introduced through the front thereof, it is equipped with four relatively wide integral corner flanges or lugs 16 each so positioned as to overlap the wall to the side and to the end of the box, as seen clearly in Figs. 1, 2 and 3. These lugs have their wall engaging faces in the plane of the front edges of the box walls. Spaced a short distance from each end wall of the box, and shown but not necessarily parallel thereto, is a partition wall 18 extending crosswise of the box and integral with the side and bottom walls, thus providing pockets 19 reserved to isolate the ends of mounting straps about to be described, which are used for maintaining the box in position in the wall and require no fastening to the latter. These mounting straps are arranged one adjacent each end of the box and in order that they may pass close along the faces of the end walls and between them and the edges of the wall opening 20, the box corner lugs 16 are spaced apart across the wall end a distance suitable for this purpose.

Fig. 10 shows one of the preferred mounting devices in perspective. It comprises a unitary construction of sheet steel, having a head 22, preferably rectangular in form for convenience and economy in cutting, and projecting at right angles to its plane and from its long edge 23 the prongs 24. These are elongated points capable of being pressed into the material of the back face of the wall for a purpose later to be described. The opposite edge of head 22 is bent at right angles about line 25 to form flange 26 parallel to the plane of the prongs and less in width than the thickness of any wall material with which it will be used. Extending from the center of the flange is the strap 27, an elongated strip of metal which is preferably longitudinally slotted as at 28 to facilitate bending thereof. The slot may be widened, as shown at 29, by a circular hole to weaken the end portion still more.

Figure 4:
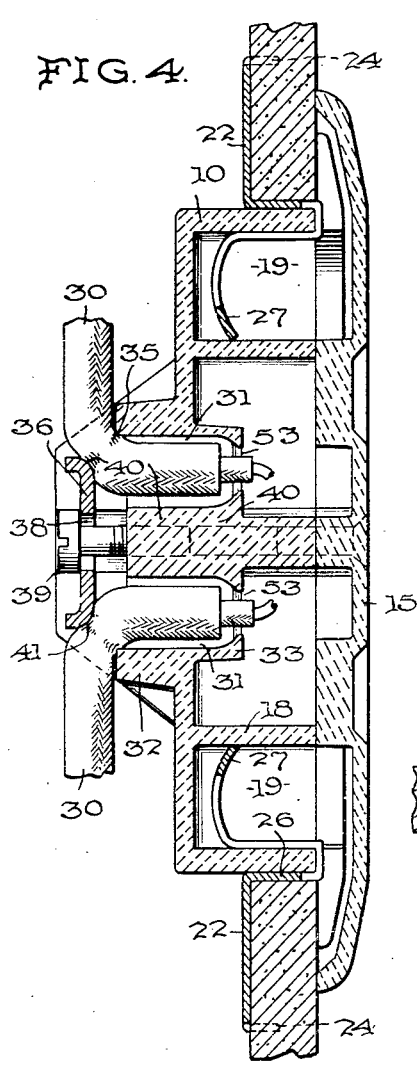
Fig. 4 is a vertical central section taken on the plane of line 4—4 of Fig. 1 and showing two cables in clamped position.
Figure 6:
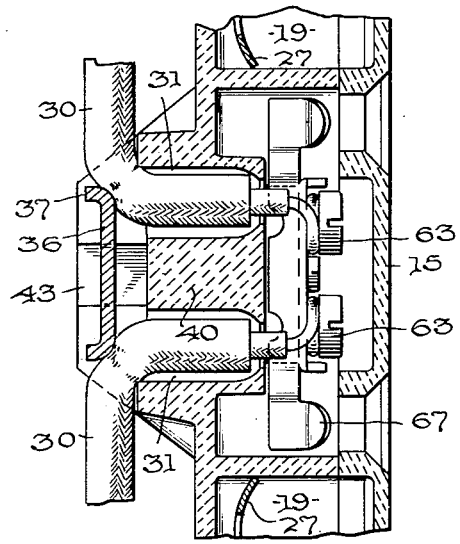
Fig. 6 is a fragmentary vertical section taken on the plane of line 6—6 of Fig. 1 and showing the connection of one conductor of each cable to one of the contact units.
Figure 7:
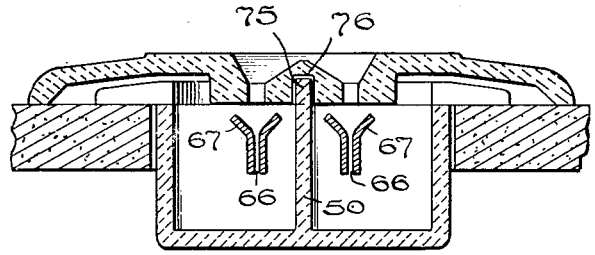
Fig. 7 is a horizontal section taken through one set of contact springs on the plane of line 7—7 of Fig. 1.
Figure 5:
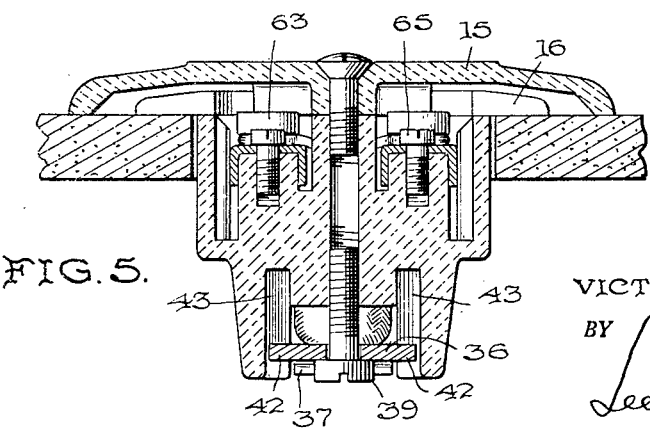
Fig. 5 is a horizontal central section taken on the plane 5—5 of Fig. 1.

For the purpose of mounting a box of the type described, which may be used for any form of wiring apparatus desired, the opening 20 in the wall is first cut to receive it loosely, and one of the straps of Fig. 10 positioned with its head beneath the material of the wall adjacent each end of the opening. With the flange 26 engaging the end wall of the hole the prongs are pressed into the wall material and the strap bent back over the front face of the wall, thus holding the strap in position against falling within the wall while the box is inserted from the front until its lugs closely engage the wall. The straps of the fastening devices are then in turn bent down over the box end walls, as best seen in Fig. 4. The bending is continued until a portion of the strap engages against the inner face of the end wall, using a screw driver or tool if necessary to press on the surface of the strap to insure all of the end of it being received in the pocket 19 reserved for that purpose and which insures it being isolated from any of the electrical parts of the apparatus. The extra bendability introduced by the wider slot 29 permits the bending up of the end where it engages the partition wall 18 in the event that the mounting wall is thin and considerable strap end is available.

In wiring a finished wall the cables or conductors are pulled into position and clamped to the box before it is secured in position. The present box is constructed with the idea of using it with one or two duplex, non-metallic sheathed cables such as illustrated at 30 in Fig. 4. These are elliptical or elongated in transverse section, as seen in Fig. 3, so that similarly cross-sectioned cable-end passages are provided through the rear wall of the box. These are elongated into chambers 31 by extending through the collar 32 projecting rearwardly from the wall and into the boss 33 on the inner face of the wall. This gives substantial depth to the cable end chambers, which may be tapered somewhat from outer to inner end and hold the cable sufficiently after insertion that the free portion may be bent down parallel to the box wall, as seen in Fig. 4, without resorting to the use of pliers. The bottom of one of the chambers 31 is preferably closed by suitable knockouts 34 permitting but a single cable to be used. These can readily be broken away if two cables are to be used to provide continuity of circuit.

The cables are adapted to be clamped in position between the rounded edges of a clamp plate 36 and the outer wall 35 of the collar, as shown in Fig. 4. The clamp plate as seen in Fig. 15 comprises a rectangular plate of heavy metal having its short edges turned up as at 37 to form the rounded engaging portions of the clamp and having an elongated central opening 38 for the passage of the clamping screw 39, received in the box material 40 between the chambers. Conveniently this is a shelf tapping screw received directly in an unthreaded hole in 40. As seen in Fig. 4, with the cables bent down substantially parallel to the back of the box, the clamp is drawn down until the rounded corners indent the outer bends of the cables, as shown at 41 and insure them remaining in position whatever strain may be placed on them.

This clamp is capable of functioning with equal facility in the case where but a single cable is used, as shown in Fig. 8. In that case the plate 36 tilts, as shown, until it engages the cable as well as one edge of the screw receiving portion 40, and is capable then of transferring the clamping action of the screw to the cable. If means were not provided to prevent it, the clamp would tend to slide in a downward direction, as viewed in Fig. 8 and place a severe transverse strain on the screw. This is eliminated by providing integral guides 42 on the longer edges of the clamping plate as seen in Fig. 15, which slide in grooves 43 molded in the side extension wings 44 of the collar 32. These prevent longitudinal movement of the plate and elongated slot 38 eliminates any bending of the screw. The guides 42 also guard the clamp and screw from accidental contact with wire lath, pipes, etc.

Although the box as just described may receive any of the more or less conventional wiring devices, it is preferred that it combine as a unitary part of the structure the necessary terminal and contact elements to convert it into a duplex convenience outlet. For this purpose a longitudinal partition 50 divides the central chamber therein into two parts. It extends centrally over the boss 33 forming the material around the cable end chambers and divides the openings at the lower ends of these chambers each into two wire passages 51 and 52, as clearly seen in Fig. 1 and in greater detail in Fig. 9. This latter figure also illustrates the breakouts 34. Preferably both of them are so arranged and the lower edge of the partition 50 so shaped, across the chamber not provided with breakouts, that a V-shape 53 is presented thereto to act as a divider for diverting the two conductors of the cable, which have been divested of their sheath and partially bared, into the openings 51 and 52, where their insulation is maintained by the partition 50.

When the cables are properly inserted and then clamped as previously described the conductors come up alongside the bolster blocks 55, formed integral with the back wall of the box. They are rectangular in plan and centrally spaced between the side walls 11 of the box and the central partition 50 therein. These bolsters are capped as shown in Figs. 1, 4, 5 and 9 by terminal plates 60 each extending for the full length of its block and having its longitudinal edges turned down alongside of the block edges as shown at 61. The ends of the plates, however, are narrowed and turned up as at 62 to form wire positioning tabs cooperating with the terminal screws 63 threaded through the metal of the cap plates, one near each end of each plate. The screws have clearance in holes 64 in the insulating material and the cap plates are mounted by self tapping screws 65 passing through them and into the material of the bolsters.

The side flanges 61 of the plate are extended in both directions beyond the ends of the blocks and bent to the configurations illustrated to be closely parallel to each other at their ends, as shown at 66 to form plug blade engaging contacts. The ends are provided with outwardly facing flared guide wings 67 to provide for the easy entrance of the prongs of an attachment plug, the spacing of the two sets of contacts on opposite sides of the partition wall being proper for the plug spacing now standardized. The wires coming through the holes 51 and 52 will be seen in a convenient position to be wrapped about the corresponding terminal screws. They cannot slip from beneath the screw heads in either direction because of the lugs 62 and the cap plate mounting screw, which is fillister headed. The manner in which the cap plates are mounted on their blocks prevents them from putting undue strain on their mounting screws.

The central partition 50 is thickened at its mid portion and bored as at 69 for the reception of a screw for holding the cover plate 15 in position. The cover plate is a conventionally molded plastic one suitably reinforced as shown in Figs. 13 and 14 and has where desired different sized plug slots 70 and 71 in each pair for the purpose of polarizing the plug. In keeping with this the cap plates and corresponding contacts are suitably colored in accordance with the underwriter's code.

To insure the proper positioning of the cover plate so that the polarized plug prongs engage the desired polarity of contact, one end of the central partition 50 at its junction with the cross partition 18 is raised in the form of a nub 75 and one of the reinforcing areas 76 in the back of the plate is recessed as at 77 to receive this nub, while the other end has no such recess. In this way the plate can only be mounted in one position on the box. Here it may be well to note that no provision need be made for variations in the positioning of the rear face of the plate in respect to the front face of the box as in older type installations where the box may be set any way but with its face flush with the front face of the wall. The mounting tabs of the box in the present construction insure its always being positioned with its front edges flush with the wall face.

Some electricians may prefer, and some types of roughly plastered metal-lath walls may require, a longer mounting strap because of the greater wall thickness. To provide for this and to eliminate the need for the prongs shown on the preferred form of mounting strap, an assemblage of two straps 80 and 81 may be made, as shown in Fig. 11. The cross or head strap 80 is of considerably greater length than the width of the opening cut in the wall to receive the box and its edges rather than its face are intended to engage the back surface of the wall. It is articulated to the bendable strap 81 as shown in Fig. 12 by forming a rivet out of the material of one of the parts, which is pressed through an opening in the other, as seen at 82, so that the head 80 may be moved in alignment with the other part to permit insertion between the edge of the hole in the wall and the end wall of the box after the latter is in position. Then by careful manipulation and inching the loosely hinged head is caused to turn and assume the position shown in Fig. 11 when the strap 81 may be bent back into the compartments 19 in the manner shown in connection with the other form of mounting strap.

I claim:

1. An electric wiring box for mounting from the room side in a rectangular opening in a finished wall and be held therein by straps engaging the wall back, passing along the edges of the opening and bent over the front edges of the box walls, said box being of integral moulded plastic insulation having ends and sides forming a rectangular configuration open at the front and a wall closing the back, an integral flange ear on each front corner of the box projecting to engage the room face of the wall adjacent both an end and a side of the opening, the ears being spaced apart on each of the ends of the box for the passage of a mounting strap therebetween, a partition integral with said box adjacent each end thereof to provide a compartment to receive the bent-in portion of a mounting strap to isolate it from the central compartment between said partitions and plug blade receiving contact means permanently mounted in said last compartment.

2. The electric wiring box as defined in claim 1, an entrance passage for duplex cable through said rear wall near the center thereof, a longitudinal divider in said central compartment changing said cable opening to a pair of laterally spaced single wire openings, and a collar projecting integrally from the back wall of said box, extending the length of said entrance passage and providing an elevated surrounding wall therefor.

3. The wiring box as defined in claim 2 wherein said collar has a portion of its wall reduced in height, a cable clamp plate positioned to engage a duplex cable entering said passage to compress it against said wall portion, a screw passing through said plate and a threaded opening in said box to receive said screw.

4. A unitary wiring device assembly for mounting from the front in a rectangular opening in a finished wall and held by straps engaging the rear face of the wall, passing through the opening against the ends thereof and bent over the front edges of the assembly comprising in combination, a moulded plastic box of rectangular configuration open at the front and closed at the back by a rear wall, an integral flange ear on each front corner of the box projecting to engage the front face of the finished wall adjacent the opening therein, the ears being spaced apart on each end of the box for the passage therebetween of a mounting strap, a pair of partitions in said box one adjacent each end thereof to form a strap-end compartment adjacent each box end, and a central compartment, front facing terminals in said central compartment, means securing the terminals directly to the material of the box and wire passages through the said rear wall adjacent said terminals and each sized to pass only the insulation of a single insulated conductor.

5. A unitary wiring device assembly for mounting from the front in a rectangular opening in a finished wall and held by straps engaging the rear face of the wall, passing through the opening against the ends thereof and bent over the front edges of the assembly comprising in combination, a moulded plastic box of rectangular configuration open at the front and closed at the back by a rear wall, an integral flange ear on each front corner of the box projecting to engage the front face of the finished wall adjacent the opening therein, the ears being spaced apart on each end of the box for the passage therebetween of a mounting strap, a pair of partitions in said box one adjacent each end thereof to form a strap-end compartment adjacent each box end and a central compartment, front facing laterally spaced blocks integral with said box rear wall, a terminal plate capping each block, a terminal screw in each plate, means integral with said rear wall forming a duct for a duplex cable and a pair of conductor passages through said rear wall leading from said duct each to adjacent a terminal screw.

6. The device of claim 5 including a partition passing between said blocks and dividing said central compartment into two chambers housing terminal assemblies of opposite polarity.

7. The device of claim 5 in which each terminal plate has downturned longitudinal sides, each side being extended at each end to form a spring contact, the contacts at each end of the plate having their ends shaped and spaced to receive and engage a plug blade.

8. The device of claim 6 in which said partition extends transversely of the said cable duct at its front end and separates it into the said conductor passages.

9. A unitary wiring device assembly including in combination, a moulded plastic box open at the front and having an integral rear wall, a compartment in said box, spaced, integral, flat-topped blocks extending from the rear wall into said compartment, metal plates covering the tops of said blocks, secured thereto and having terminal screws therein, said plates having their sides turned down along parallel edges of their blocks and extended beyond the length of the block into arms, the two arms at the end of a plate being curved toward each other, each arm having a contact end to cooperate with a plug blade.

10. The wiring device of claim 9 in which a single plate covers each block and each end of each plate is turned up to cooperate with one of the terminal screws to position a conductor wire.

11. The wiring device of claim 9 in which said rear wall is provided with two sets of paired wire openings, each opening being adjacent a terminal screw, each pair being in transverse alignment between the blocks, a duct for a duplex cable extending normally through the back wall for and in alignment with each pair of wire openings, said ducts being spaced apart and a common cable clamping plate having parts overlying both duct exits.

12. A moulded plastic wiring box including an integral rear wall, a pair of spaced ducts extending through and substantially normal to the wall and each being sized to closely fit an elliptical duplex cable of the non-metallic sheath type, the short axes of the ducts being in alignment, a single cable clamp plate adapted to engage cables in both ducts to press them against the outer edges of their ducts and bend them downwardly toward parallelism with said back wall, and a central screw passing through said plate and engaging in the material of the box to provide the clamping pressure.

13. The box defined in claim 12 in which the ducts are increased in length by a boss extending from said rear wall.

14. The box defined in claim 12 in which a longitudinal partition divides the interior and is positioned on said duct axes to guide the wires of each cable to opposite sides thereof.

15. The box as defined in claim 12 wherein the clamp plate is provided with lugs extending on its central transverse axis, guide means on said box for said lugs to restrict movement of the plate along its longitudinal axis whereby a single cable may be clamped without lateral strain on the clamping screw.

References Cited in the file of this patent

UNITED STATES PATENTS

| 1,176,659 | De Reamer | Mar. 21, 1916 |
| 1,972,794 | Reese | Sept. 4, 1934 |
| 2,119,066 | Abbott | May 31, 1938 |
| 2,309,189 | Hancock et al. | Jan. 26, 1943 |
| 2,437,802 | Adler | Mar. 16, 1948 |
| 2,451,267 | Wilder | Oct. 12, 1948 |
| 2,454,119 | Atkinson | Nov. 16, 1948 |
| 2,459,659 | Kolb | Jan. 18, 1949 |
| 2,586,728 | Shepard | Feb. 19, 1952 |
| 2,658,704 | Smith | Nov. 10, 1953 |